United States Patent Office 3,488,692
Patented Jan. 6, 1970

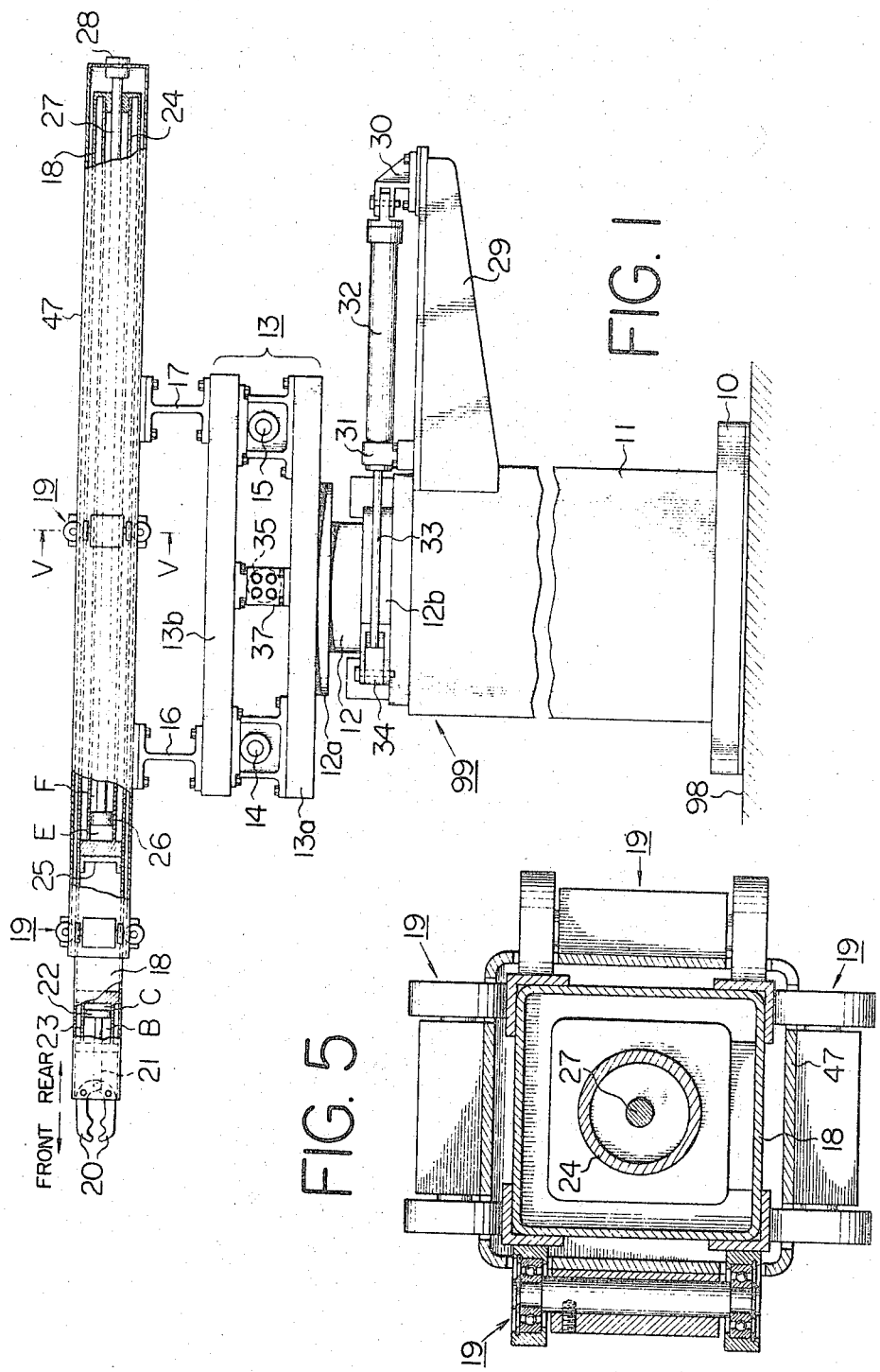

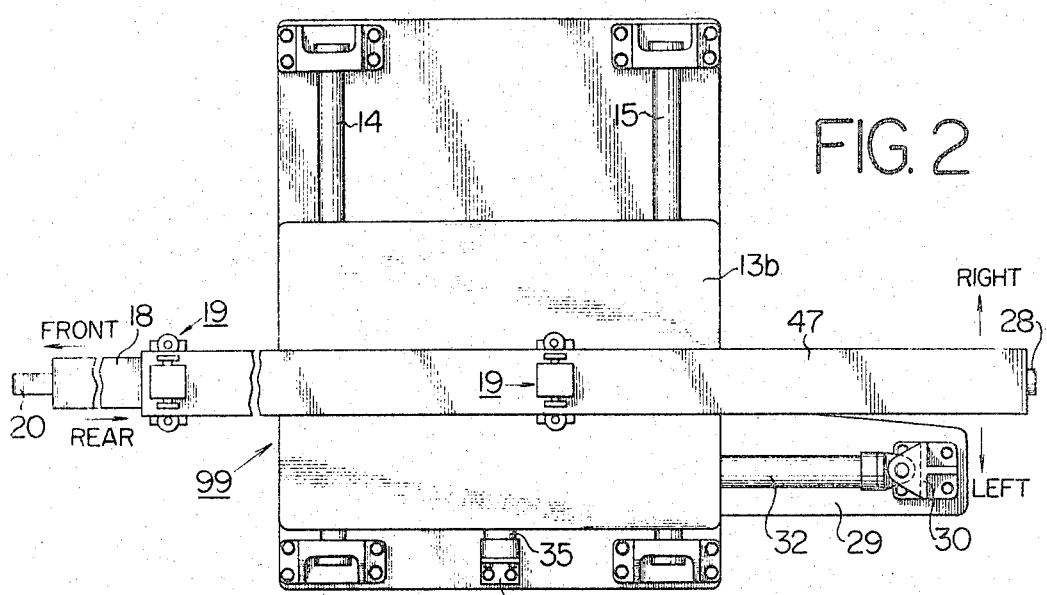
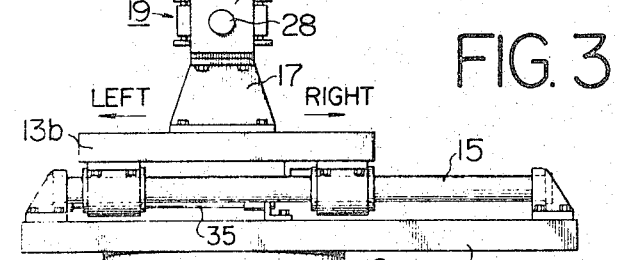
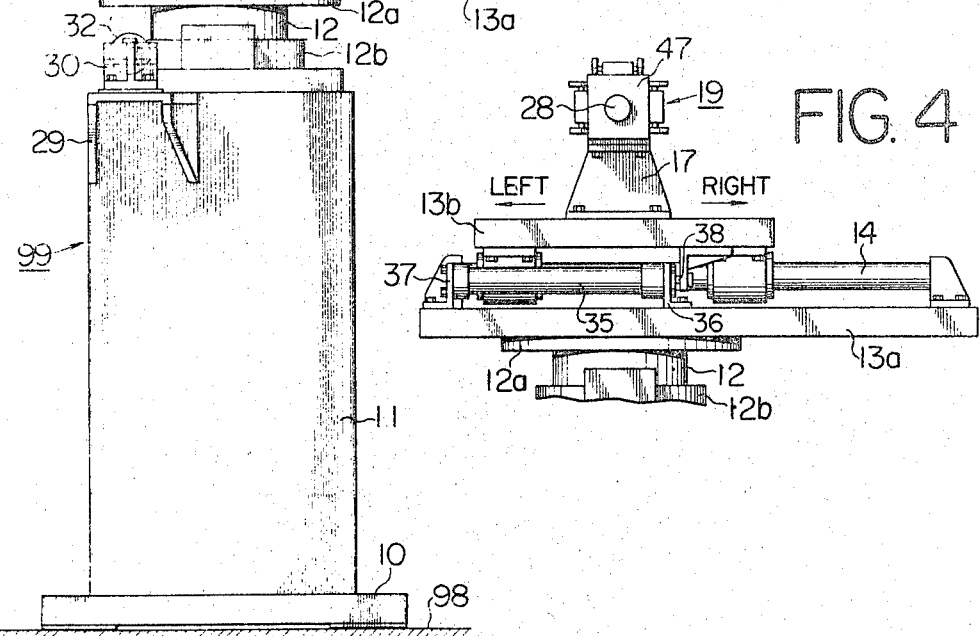

3,488,692
TRANSFER MACHINE FOR DIE-CAST PRODUCTS
Masanari Oda and Masakazu Fujikawa, Kariya-shi, Japan, assignors to Aisin Seiki Company Limited, Asahi-machi, Kariya-shi, Aichi-ken, Japan
Filed Feb. 8, 1968, Ser. No. 704,175
Claims priority, application Japan, Feb. 8, 1967, 42/8,398
Int. Cl. B25j 9/00
U.S. Cl. 214—1                    12 Claims

ABSTRACT OF THE DISCLOSURE

A transfer machine for transferring die-cast products from a die-casting machine in a successive order to an after-finishing station comprising a multiple hydraulic piston-cylinder arrangement adapted for operating a chuck-carrying arm so as to describe an elongated rectangular travel passage.

---

This invention relates to a transfer machine, capable of obviating generally adopted manual jobs which are generally adopted in the conventional technique in the course of transferring die-cast products sequentially as cast from a die-casting machine to an after-treating station such as definning press as an example.

This kind of transferring job has generally been performed substantially exclusively by hands, because the die-cast product as cast has a high temperature such as several hundred degrees centigrade which fact led to a considerable difficulty in automation and mechanization of such job.

The primary object of the invention is to provide a transfer machine of the above kind, capable of automating and mechanizing the transferring operation of die-cast products from a steppingly casting die-cast machine to a certain after-finishing station such as definning press, said transferring operation being generally carried out substantially in a manual manner.

A further object is to provide a transfer machine of the above kind, capable of improving the die-cast product transferring operation so as to match the sequential casting operation of the regular die-casting machine adapted for mass production.

A still another object is to provide a machine of the above-kind, capable of substantially improving the said kind of transferring job from the point of operational efficiency, time-sparing and costs for the operation.

Still further object is to provide a transfer machine of the above kind which may provide an improved safety in the treatment of the die-castings as cast.

Still another object is to provide a machine of the above kind, capable of providing a stabilized and standardized die-cast products by subjecting them to a uniform and equalized after-treatment in the course of transferring job of the die-castings as cast.

These and further objects, features and advantages of the invention will become more clear and specific, when read the following detailed description of substantially a preferred embodiment of the invention shown in the drawings only for illustrative purposes and thus in no limiting sense of the invention, and its scope will be pointed out in the appended claims.

In the drawings:

FIGURE 1 is a front view of essential parts of the product transfer machine constructed in accordance with the novel teaching of the invention, wherein however several parts are shown in section and several parts have been broken away for illustrating inner working elements.

FIGURE 2 is a top plan view of the machine shown in FIGURE 1.

FIGURE 3 is a side view of the machine shown in FIGURES 1 and 2, when seen from the right-hand side of FIGURE 1.

FIGURE 4 is an enlarged and more detailed view of essential part of FIGURE 3 wherein however several parts are shown in section.

FIGURE 5 is an enlarged cross-sectional view substantially taken along a sectional line V—V in FIGURE 1.

Figure 6:
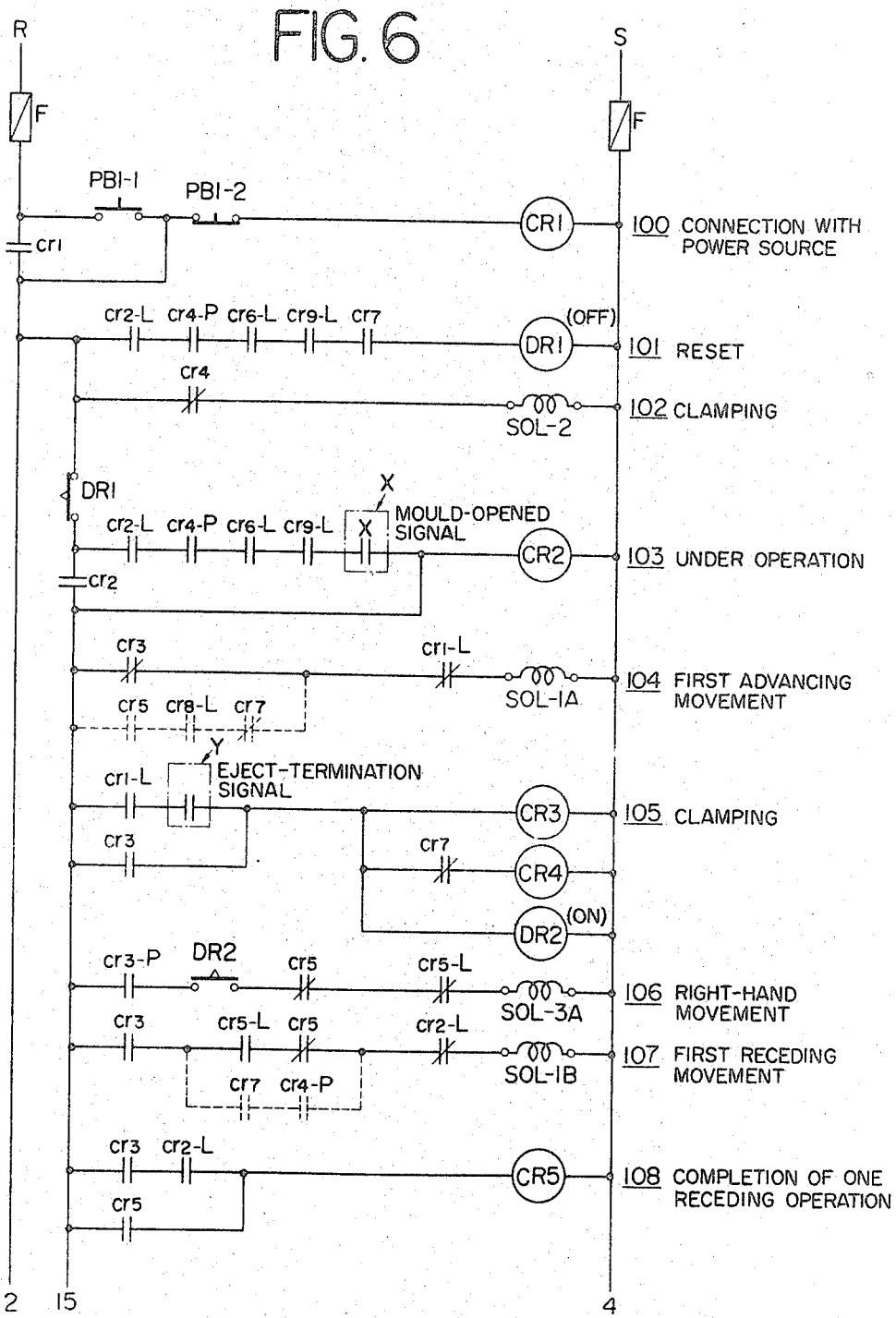
FIGURES 6 and 7 show in combination an electric wiring diagram showing a control circuit for the machine shown in the foregoing several figures.

Referring now to the drawings, the invention will be described more in detail by reference to substantially a sole preferred embodiment shown therein, the machine is shown generally by 99 and comprises a bed 10 and a stand 11, said bed being mounted stationarily on a floor of a die-casting factory, although not shown. In the upper part of the stand 11, a column 12 is rotatably mounted, although the upper cylindrical part of stand 11 formed for this purpose is not specifically shown. The top end of said rotatable column 12 is enlarged at 12a which mounts a frame generally shown at 13 which comprises a lower part 13a and an upper part 13b. Although the lower part 13a is rigidly connected with the enlarged top end 12a, the upper part 13b is slidable in the perpendicular direction relative to the plane of the drawing of FIGURE 1.

For this purpose, there are two parallel guide bars 14 and 15 which are rigidly mounted on said lower part 13a. The guiding mode will be most clearly seen from FIGURE 3 and thus no further analysis may be necessary in this respect. A pair of parallel I-bars 16 and 17 are rigidly mounted on the top of said upper part 13b and mounts in turn rigidly an elongated, horizontally extending outer box member 47. An elongated inner box member 18 is telescopically mounted in said outer box member 47 by means of two pair of eight rollers 19, a pair of clamping jaws 20 which may be expressed as a whole by "chuck" being mounted on the free or left-hand end of the inner box member 18, as seen in FIGURES 1 and 2, respectively. The chuck 20 is operatively connected by a rod 21 with a piston 22 which is movably contained in a hydraulic cylinder 23 mounted fixedly in the inner box member 18 as shown in FIGURE 1. The interior space of said hydraulic cylinder 23 is divided into front and rear working chambers B and C. When pressurized oil is fed to the front chamber B the chuck 20 is operated to close, while, when oil is supplied to the rear chamber C, the chuck will be opened, the former position being shown in FIGURE 1.

A further and elongated hydraulic cylinder 24 is rigidly mounted within the interior space of the inner box member 18 by means of a fixing member 25 and contains therein a piston 26 to which a rod 27 is connected rigidly. This piston rod 27 is rigidly connected at its free end at 28 with the right-hand end of the outer box member 47, when seen in FIGURE 1. Therefore, the piston 26 is stationary relative to the member 47. The interior space of the hydraulic cylinder 24 is divided into front and rear working chambers E and F by its piston 26. With feed of pressurized oil to the front chamber E, the inner box member 18 will be actuated to perform an advancing movement while carrying the chuck 20 thereon. On the contrary, when oil is fed to the rear chamber F, the inner box member will perform a receding or return stroke movement along the axis of itself and thus that of said outer box member.

From the upper part of stand 11, a horizontal support 29 projects laterally thereof and mounts rigidly a pair of brackets 30 and 31 for supporting in turn rigidly a hydraulic cylinder 32, as referred to as "turning cylinder" throughout this specification. This cylinder 32 contains naturally therein a piston, not shown, which is rigidly connected with a rod 33, the free end of which is hinged at 34 to the collar at 12b made integral with the rotatable column 12. By pressurizing this cylinder 32, the column 12, together with its mounting assembly so far described, can be turned to-and-fro about 90 degrees about the vertical axis of the column 12 and thus that of the transfer machine.

A still further hydraulic cylinder 35 is rigidly mounted on the lower part 13a of frame 13 by means of a pair of brackets 36 and 37, as most clearly seen from FIG. 4, said cylinder 35 containing a piston not shown, which is rigidly connected with a rod 38 connected in turn rigidly with the upper part 13b of said frame 13. By pressurizing the cylinder 35, the upper part 13b, together with its mounting parts is caused to shift in the left-hand or right-hand direction, when seen in FIGURE 4, as the case may be, while being guided by bars 14 and 15, as was briefly described hereinbefore.

Next, referring to FIGS. 6–8, the nature and function of the electric circuit and hydraulic circuit employed in the present machine will be described hereinbelow.

Figure 7:
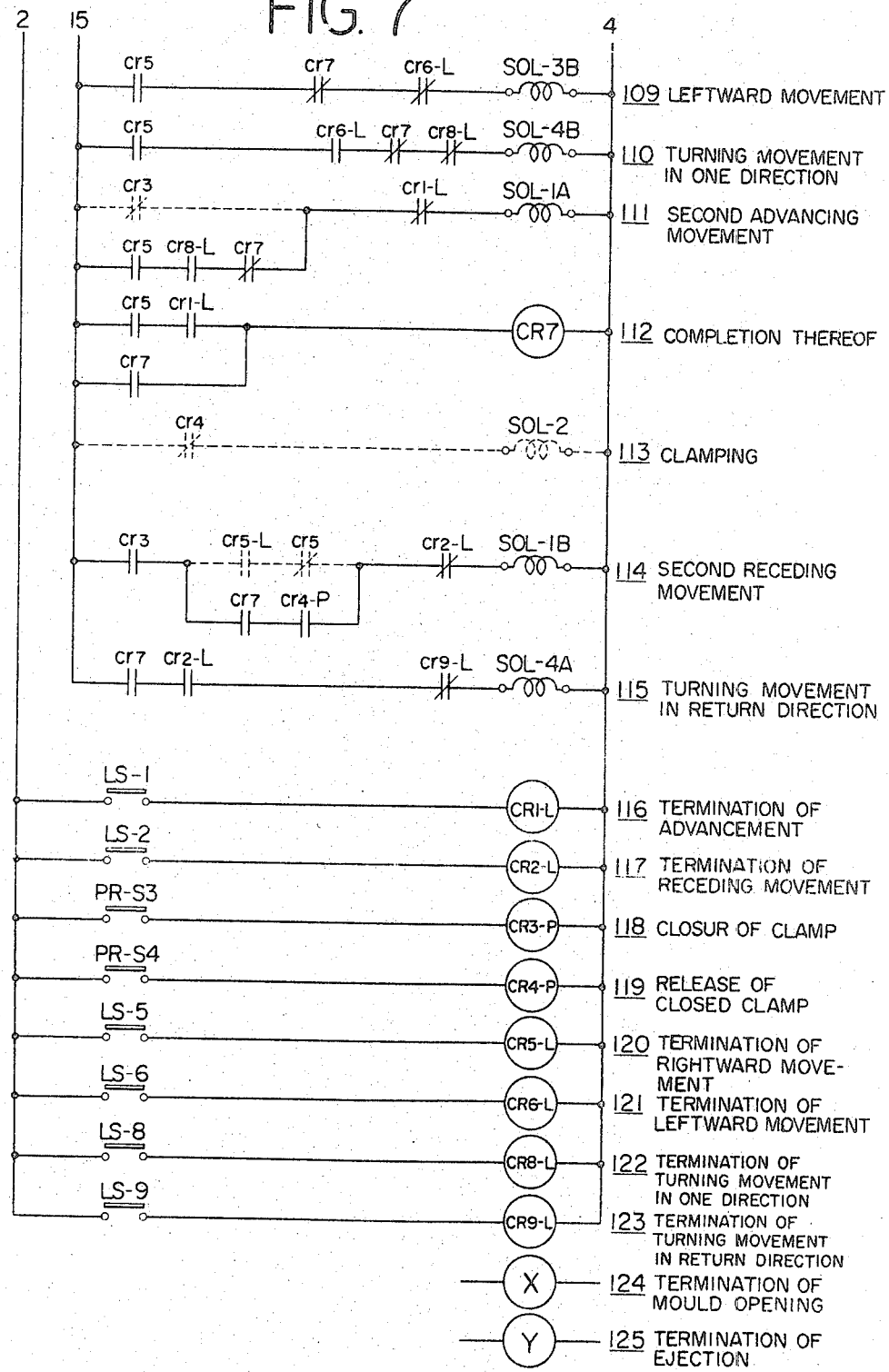

In FIGS. 6 and 7, in combination, the main electric control circuit adapted for function control of the arm 18 and the clamp- or chuck means 20 of the transfer machine is shown. In the drawings, however, control means used for water cooling of die-casting mould and those for press- or definning job have been omitted for the simplicity of the drawing.

Figure 8:
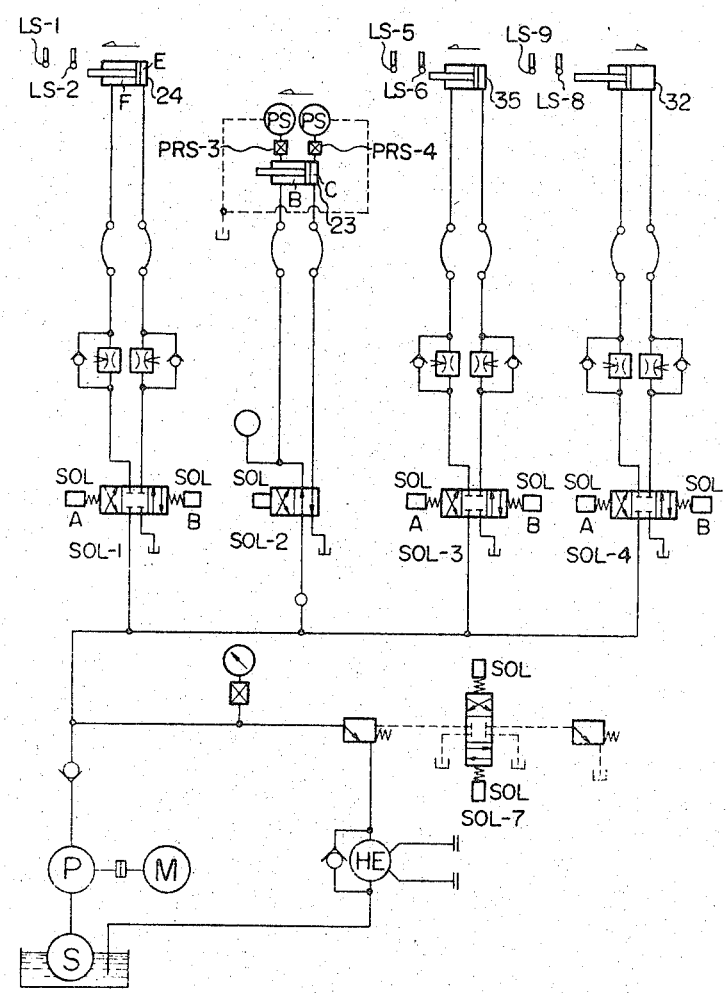
FIGURE 8 is a schematic diagram for the illustrating the working modes of several hydraulic cylinders embodied in the transfer machine according to the invention.

In FIG. 8, hydraulic and electric circuits adapted for the control of longitudinal movement cylinder 24, product-clamp cylinder 23, lateral movement cylinder 35 and turning cylinder 32 are shown.

In the following, the operating steps of the transfer machine will be described by reference to FIGURES 6–10.

GENERAL

By actuating main push button switch PB1–1, current will be fed from a commercial power source, 220 volts, not shown, through a transformer, not shown, to the electric control circuit shown in combination in FIGS. 6–7. This feed current is preferably of 100 volts and fed through conductive leads R and S and the now closed main push button switch PB1–1 and an emergency push button switch PB1–2 (see circuit part 100). "F" denotes safety fuse means.

In the reset circuit part 101, there is provided a timer DR1 for the selective determination of the time duration of one cycle of step operations to be carried into effect by the aforementioned machine. If the practical duration of time of one cycle of the machine should exceed the preset value, then the timer operates so as to stop the machine operation. Such a longer operational period is deemed as an emergency and a certain alarm, not shown, will be actuated.

By manual closure of said main switch PB1–1, the drive motor M of hydraulic pump P (FIG. 8) is actuated so as to feed pressurized oil to every oil circuits to be mentioned.

At the same time, relay coil CR1 is energized so that one of its relay contacts at cr1–a, normally open, is thereby closed for self-maintaining the circuit part 100.

Preliminary operation—Step 1 (refer to circuit part 103)

When the die-casting machine, herein briefly denoted only by "DCM," has completed the mould-opening operation ready for discharging a molded piece such as an automotive door handle, an electric signal representative of such mould-opening is delivered from a certain conventional means to the circuit part 103, as denoted in a symbolized way by "X" shown therein, thereby relay coil CR2 inserted therein being energized. By this procedure, the operational relationship between the die-casting machine DCM and the aforementioned transfer machine is established and the latter is caused to start. By the energization of relay coil CR2, one of its contact at cr2–a is closed and the circuit part 103 is self-maintained.

Second operational step—first longitudinal advancement of arm (refer to circuit part 104)

Upon actuation of relay CR2, solenoid SOL–1A is energized through relay CR3 and its relay contact cr1–L and pressurized oil is fed to the working chamber E of longitudinal movement cylinder 24 so that inner box 18 and chuck 20 are caused to advance towards the DCM-machine, until limit switch LS–1 (see, circuit part 116) is actuated so as to interrupt the current passage in one way direction, including relay contact cr1–L, thereby the advancing movement of the arm being brought into termination. The time point for this completion of advancing movement can be adjusted as desired by modifying the position thereof.

Third operational step—Eject of die-cast products

Simultaneous with issuance of a signal representative of the die-casting operation (refer to second step), a conventional ejector fitted on the DCM-machine is actuated as conventionally, and the product is ejected from the open mould.

Fourth operational step—Clamping (refer to circuit part 105)

Where an eject-termination signal is generated in a conventional device, not shown, and delivered to the circuit part 105 as shown by "Y" in a simplified manner. and upon the interruption of the foregoing circuit part which has been described hereinabove in connection with the advancing movement of the chuck or clamping jaws, the latter causing the opposite circuit passage including cr1–L, relay CR3 is caused to actuate and solenoid SOL–2 (see circuit part 102) in interrupted, thereby pressurized oil being fed to the working chamber B of hydraulic cylinder 23 and the chuck 20 being caused to close so as to grasp the die-cast product under consideration.

Fifth operational step—Right handward movement (see circuit part 106)

Upon the grasping action carried out by the chuck 20, pressure-sensitive switch cr3–P acknowledges this operation and solenoid SOL–3A is energized through timer DR2 for setting of clamping operation period; relay CR5 and relay contact cr5–L, thereby the cylinder 35 being fed with oil and the machine frame 13 being caused to move as a whole in the right-hand direction. The range of this movement can be adjusted by properly selecting the position of limit switch LS–5 (see, circuit part 120).

When the chuck has been moved to the end of its right-hand movement stroke, limit switch LS–5 (see circuit part 120) is actuated and relay contacts cr5–L are interrupted, thereby solenoid SOL–3A being de-energized and the right-handward movement being terminated.

Sixth operational step—First longitudinal receding movement (see circuit part 117)

In this case, relay contact cr5–L is closed and solenoid SOL–1B inserted in circuit part 107 is energized, thereby oil pressure being supplied to the rear working chamber F of hydraulic cylinder 24 and the inner box or arm 18 being caused to recede. At the terminal of this receding stroke of the arm, limit switch LS–2 inserted in circuit part 117 is opened and solenoid SOL–1B is deenergized, thereby completing the receding stroke of the arm.

In the present embodiment, the advancing and receding movements of said arm are carried into effect twice. In order to prevent a possible malfunction, relay CR5 inserted in circuit part 108 is actuated through actuation of relay contacts cr3 and cr2–L and thereafter self-maintained so as to make ready for carrying out further succeeding operations, thereby providing a positive distinction between the first and the second cycle of arm-reciprocating movement.

Seventh operative mode—Lateral leftward or return movement (refer to circuit part 109)

By closure of relay contacts cr5, cr7 and cr6–L, solenoid SOL–3B inserted in circuit part 109 is energized, for feeding oil pressure to hydraulic cylinder 35 into its working chamber destined for leftward or return stroke, thereby the machine frame 54 being returned to a certain predetermined distance so as to recover the previous lateral shift performed in the foregoing stage (5).

This mode of operation can be omitted when a number of same kind products are to be manufactured.

Eighth operational step—Forward turning (see circuit part 110)

Figure 10:
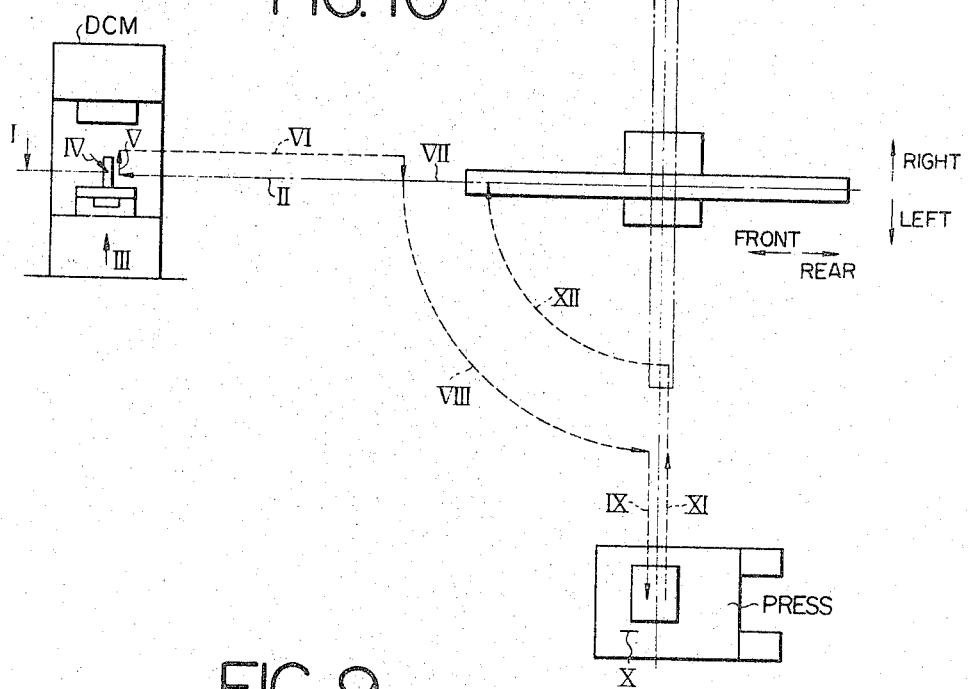
FIGURE 10 is a layout scheme of a die-casting plant including the transfer machine according to the invention.

The machine frame 54 is turned so as to direct it towards the press machine, which is shown by "PRESS" in FIG. 10.

In this case, solenoid SOL–4A is energized through relays CR5, CR6–L, CR7 and CR8–L, and oil pressure is fed to the forward working chamber of the turning hydraulic cylinder 32, thereby the frame 13 being caused to swivel in the forward turning direction.

At the end of this forward turning stroke, limit switch LS–8 (circuit part 122) is actuated which represents the termination.

Ninth operational step—Second longitudinal advancing movement (see circuit parts 112 and 116)

By this second advancing movement of the inner box 24, the carried product is forwarded to the press. Upon completion of the forward turning movement set forth above, relay CR8–L inserted in circuit part 122 is actuated, and solenoid SOL–1A in circuit part 104 is energized through relays CR5, CR7 and CR1–L. Therefore, the inner box 24 performs telescopically its second advancing stroke as in the first advancing stroke. At the terminal end of this second longitudinal advancement, limit switch LS–1 in circuit part 116 is turned "on" and relay CR1–L is energized so as to actuate relay CR7 inserted in circuit part 112. Thus, solenoid SOL–1A inserted in circiut part 111 is de-energized. The second advancing movement is thus completed. Relay CR7 will be maintained still further.

Tenth operational step—Release of closed clamp (see circuit part 113)

By the relay CR7, relay CR4 inserted in circuit part 105 is de-energized, while solenoid SOL–2 inserted in circuit part 113 is energized, thus oil pressure being fed to the working chamber C of clamp cylinder 23 so as to release the closed chuck 20. The released product, although not shown, will drop into the press.

Eleventh operational step—Second longitudinal receding movement (refer to circuit parts 114 and 117)

Upon release of the closed chuck 20, pressure switch CR4–P is actuated so as to acknowledge said chuck release, and solenoid SOL–1B in circuit part 114 is energized through relays CR3, CR7 and CR2–L, thereby oil pressure being fed to the working chamber F of hydraulic cylinder 24, so as to recede the inner box 18.

At the termination of said receding stroke of the inner box 18, solenoid SOL–1B is de-energized to show the termination.

Twelfth operational step—Return turning (refer to circuit parts 115 and 123)

By the energization of relay CR2–L in circuit part 117, the solenoid SOL–4A in circuit part 115 is energized through relays CR7, CR2–L and CR9–L, so as to feed oil pressure to the return working chamber of the turning cylinder 32, thereby the machine frame 13 performing the return turning movement for recovering its starting position shown in FIG. 10 by full line, which corresponds to that shown in FIGS. 1–5. Upon completion of this return swivel movement of the machine frame, limit switch LS–9 in circuit part 123 turns "on" and relay CR9–L is energized to acknowledge the completion of the return swivel. Then, the timer DR1 preset beforehand is made off.

Thus, a plurality of scheduled stepwise movements has been completed in an automatic manner, and the transfer machine is ready for performing a next succeeding series of scheduled step-wise movements for transferring a new die-cast product from the DCM-machine to the trimming press, as an example.

The main feature of the operation of the aforementioned machine resides in its broadest aspect in the rectangular movement of the chuck when seen in the plan view of the machine. Other operations may be modified so as to meet occasional demands.

Figure 9:
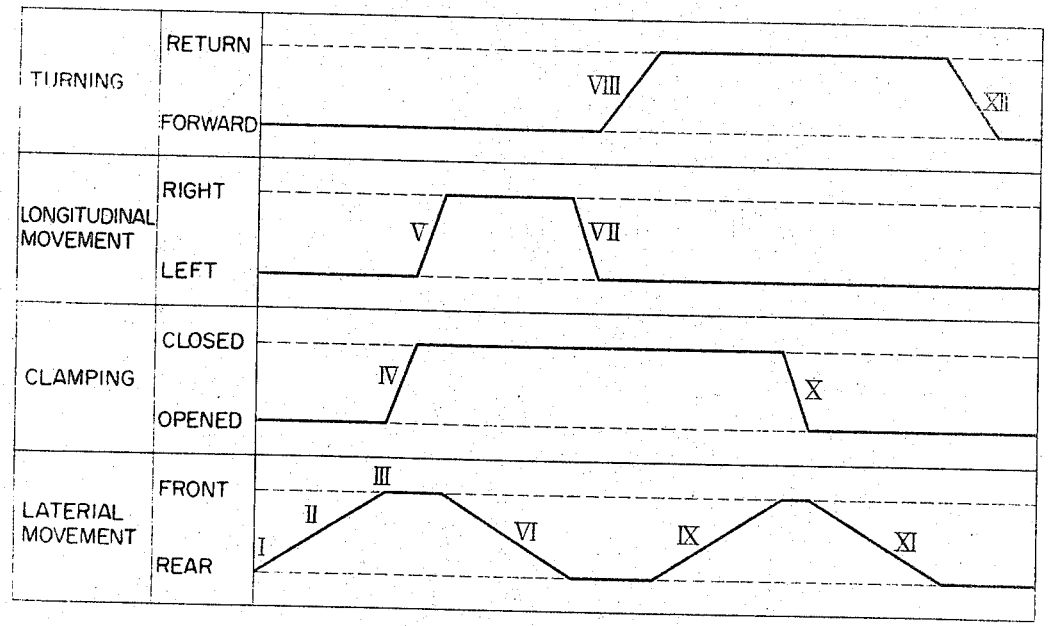
FIGURE 9 is a chart for the illustration of the sequence of the operations carried out by several main working parts of the machine.

In FIGURE 9, aforementioned four kinds of main operation are shown diagrammatically for showing relative phase relationship in a more clear manner. Numerals I, II . . . XII correspond to aforementioned first to twelveth operational steps.

In FIGURE 10, a general arrangement of a die-cast product transfer plant is shown, in which several numerals I, II . . . XII represent again the foregoing first to twelfth operational steps, respectively.

The meaning of these figures will be self-explanatory and thus no further detailed description may be made without sacrificing in any way better understanding of the invention.

The invention may be embodied in other specific forms without departing from the spirit or essential characteristics thereof. The present embodiment is therefore to be considered in all respects as illustrative and not restrictive.

What we claim is:

1. A transfer machine for die cast products, comprising a chucking means having a pair of clamping jaws pivotably connected with each other; an operating means connected with said chucking means and adapted for closing and releasing the latter; a first elongated box member carrying thereon said chucking means and therein said operating means; a second elongated box member mounting therein said first box member in a telescopic manner; a first hydraulic piston and cylinder assembly connected between said box members for advancing and receding said first box member in a concentric and telescopic manner; said operating means further comprising a second hydraulic piston and cylinder assembly, for clamping die cast products fixedly mounted in said first box member; a stationary stand; a rotatable column mounted in said stand; a lower frame member rigidly mounted on said column, an upper frame member mounted slidably and perpendicularly to the movement direction of said first box member, said second box member being fixedly mounted on said upper frame member; a third hydraulic piston and cylinder assembly for turning movement and rigidly mounted between said column and said stand; a fourth hydraulic piston and cylinder assembly for rightward and leftward movement of said second box member and rigidly mounted on said lower frame member.

2. A transfer machine as set forth in claim 1 including a first and a second self-maintaining relay means; a relay means for terminating the advancing movement of said first box member, all the relay means being closed in accordance with the advancing movement of said first box member; and a first solenoid means being energized in response to a signal delivered thereto after the ejecting operation of the die casting machine, wherein according to the energization of said first solenoid means hydraulic fluid is fed to one of the chambers in said second cylinder assembly for closing said clamping jaws.

3. A transfer machine as set forth in claim 2, including a relay means for completing a clamping operation; a first timer switch means for setting the clamping operation period and a second solenoid being energized thereby, wherein hydraulic fluid is fed to one of the chambers of said fourth cylinder assembly in accordance with the energization of said second solenoid means and for rightwardly moving said second box member.

4. A transfer machine for die cast products as set forth in claim 2, including a relay means, for terminating the rightward movement of said second box member, being closed through said first self-maintaining relay and in accordance with said rightward movement, and a third solenoid being energized thereby, wherein hydraulic fluid is fed to one of the chambers of said first cylinder assembly according to the energization of said third solenoid and for receding said first box member.

5. A transfer machine for die cast products as set forth in claim 4, including a third self-maintaining relay means being closed in accordance with completion of the receding movement of said first box member and a fourth solenoid being energized thereby, wherein hydraulic fluid is supplied to another chamber of said fourth cylinder assembly according to the energization of said fourth solenoid and for leftward stroke of said second box member.

6. A transfer machine for die cast products as set forth in claim 5, including a relay means for completing the leftward movement of said second box member being closed through said third self-maintaining relay, and a fifth solenoid being energized thereby, wherein hydraulic fluid is fed to one of the chambers of said third cylinder assembly for turning of said second box member according to the energization of said fifth solenoid.

7. A transfer machine for die cast products as set forth in claim 6, including a relay means for completing of the turning movement of said second box member being actuated through said third self-maintaining relay means and in accordance with said forward turning movement, and a sixth solenoid means being thereby energized, wherein hydraulic fluid is fed to another chamber of said first cylinder assembly according to the energization of said sixth solenoid and for advancing said first box member.

8. A transfer machine for die cast products as set forth in claim 7, including a fourth self-maintaining relay means being closed in accordance with the completion of the advancing movement of said first box member and de-energization of said second self-maintaining relay means, and a seventh solenoid being energized thereby, wherein hydraulic fluid is fed to another chamber of said second cylinder assembly according to the energization of said seventh solenoid and for releasing said two clamping jaws.

9. A transfer machine for die cast products as set forth in claim 8, including a relay means for releasing said clamping jaws that were closed through said first and fourth self-maintaining relays, and an eighth solenoid being energized thereby, wherein hydraulic fluid is fed to said one of the chambers of said first cylinder assembly according to the energization of said eighth solenoid and for receding said first box member.

10. A transfer machine for die cast products as set forth in claim 9, including a relay means for completing the receding movement of said first box member being closed through said fourth self-remaining relay and in accordance with said receding movement of said first box member, and a ninth solenoid being energized thereby, wherein hydraulic fluid is fed to another chamber of said third cylinder assembly according to the energization of said ninth solenoid and for returning said second box member to its initial position.

11. A transfer machine as set forth in claim 10, including a second timer switch means for setting of one cycle operation period of said transfer machine.

12. A transfer machine for die cast products comprising:
a base;
an elongated hollow member mounted on the base for reciprocal and rotational movement;
a pair of clamping jaws mounted on the elongated hollow member;
a first hydraulic means operatively connected to the hollow member for advancing and retracting the hollow member in a first direction;
a control relay means operatively connected to the hollow member;
a pair of relay contacts, the relay contacts capable of latching the control relay to provide control of the cyclic movement of the hollow member;
a second hydraulic means mounted on the elongated hollow member and operatively connected to the clamping jaws;
a pressure sensitive switch means responsive to pressure in the second hydraulic means;
a timer operatively connected to the pressure sensitive switch and second hydraulic means for setting the clamping operation period;
a third hydraulic means operatively connected to the hollow member for advancing and retracting the hollow member in a second direction; and
a fourth hydraulic means operatively connected to the hollow member for controlling the rotation of the hollow member.

References Cited
UNITED STATES PATENTS 3,306,471   2/1967   Devol _____ 214—1

ROBERT G. SHERIDAN, Primary Examiner

G. F. ABRAHAM, Assistant Examiner